US009990096B2

(12) United States Patent
Graf

(10) Patent No.: US 9,990,096 B2
(45) Date of Patent: Jun. 5, 2018

(54) ELLIPTICAL CAPACITIVE SENSOR ELECTRODE PATTERN AND SENSING THEREWITH

(71) Applicant: Synaptics Incorporated, San Jose, CA (US)

(72) Inventor: Arnulf B. A. Graf, Pasadena, CA (US)

(73) Assignee: Synaptics Incorporated, San Jose, CA (US)

( * ) Notice: Subject to any disclaimer, the term of this patent is extended or adjusted under 35 U.S.C. 154(b) by 10 days.

(21) Appl. No.: 14/985,154

(22) Filed: Dec. 30, 2015

(65) Prior Publication Data

US 2017/0192552 A1 Jul. 6, 2017

(51) Int. Cl.
G06F 3/044 (2006.01)

(52) U.S. Cl.
CPC .... G06F 3/044 (2013.01); G06F 2203/04103 (2013.01)

(58) Field of Classification Search
CPC .......... G06F 3/044; G06F 2203/04103; G06F 3/0416; G02F 1/13338
See application file for complete search history.

(56) References Cited

U.S. PATENT DOCUMENTS

| | | | |
|---|---|---|---|
| 7,372,281 B2 | 5/2008 | Morimoto | |
| 7,466,307 B2 | 12/2008 | Trent, Jr. et al. | |
| 7,502,016 B2 | 3/2009 | Trent, Jr. et al. | |
| 7,705,612 B2 | 4/2010 | Morimoto | |
| 7,710,126 B2 | 5/2010 | Morimoto | |
| 7,764,274 B2 | 7/2010 | Westerman et al. | |
| 8,237,453 B2 | 8/2012 | Badaye et al. | |
| 8,440,920 B2 | 5/2013 | Bulea et al. | |
| 2006/0227117 A1 | 10/2006 | Proctor | |
| 2008/0084394 A1 | 4/2008 | Kang | |
| 2009/0002338 A1 | 1/2009 | Kinoshita et al. | |
| 2009/0251439 A1 | 10/2009 | Westerman et al. | |
| 2009/0284495 A1* | 11/2009 | Geaghan | G06F 3/0416 345/174 |
| 2010/0097077 A1 | 4/2010 | Philipp et al. | |
| 2010/0149092 A1 | 6/2010 | Westerman et al. | |
| 2010/0149134 A1 | 6/2010 | Westerman et al. | |
| 2016/0048246 A1* | 2/2016 | Park | G06F 3/044 345/173 |

(Continued)

Primary Examiner — Jennifer Mehmood
Assistant Examiner — Sardis F Azongha
(74) Attorney, Agent, or Firm — FBFK PC

(57) ABSTRACT

A capacitive sensor electrode pattern comprises a plurality of sensor electrodes. The plurality of sensor electrodes are disposed in a common layer with one another and arranged to form an ellipse. The plurality of sensor electrodes comprises first, second, and third subsets of sensor electrodes. The first subset of sensor electrodes has a first shape and a first surface area, wherein centers of mass of the first subset of sensor electrodes are substantially coincident with nodes of a coordinate system. The second subset of sensor electrodes has a second subset of sensor electrodes has a second shape and a second surface area. The third subset of sensor electrodes has a third shape and a third surface area. The first, second, and third shapes are all different. The first, second, and third surface areas are all different, and the second and third surface areas are less than the first surface area.

20 Claims, 9 Drawing Sheets

(56) References Cited

U.S. PATENT DOCUMENTS

2016/0085334 A1\* 3/2016 Hashimoto ............. G06F 3/044
    345/174
2016/0320913 A1\* 11/2016 Gao ...................... G06F 3/0418
2017/0024030 A1\* 1/2017 Wu ......................... G06F 3/041
2017/0242545 A1\* 8/2017 Kimura ................. G06F 3/0418

\* cited by examiner

600

```
ACQUIRE CAPACITIVE RESULTING SIGNALS FROM THE FIRST SUBSET OF
SENSOR ELECTRODES, THE SECOND SUBSET OF SENSOR ELECTRODES, AND
THE THIRD SUBSET OF SENSOR ELECTRODES
610
```

↓

```
SCALE UP THE CAPACITIVE RESULTING SIGNALS RECEIVED FROM THE
SECOND AND THIRD SUBSETS OF SENSOR ELECTRODES TO ACHIEVE
SCALED RESULTING SIGNALS
620
```

↓

```
INTERPOLATE POSITION ESTIMATES CALCULATED FROM THE RESULTING
SIGNALS OF THE FIRST SUBSET OF SENSOR ELECTRODES AND THE SCALED
RESULTING SIGNALS OF THE SECOND AND THIRD SUBSETS OF SENSOR
ELECTRODES, WHEREIN THE INTERPOLATION IS BASED ON RESPECTIVE
DEVIATIONS FROM THE NODES OF THE COORDINATE SYSTEM TO ACHIEVE
INTERPOLATED POSITION ESTIMATES
630
```

```
DETERMINE A LOCATION OF AN INPUT OBJECT WITH RESPECT TO THE
CAPACITIVE SENSOR ELECTRODE PATTERN BASED ON THE INTERPOLATED
POSITION ESTIMATES
640
```

ELLIPTICAL CAPACITIVE SENSOR ELECTRODE PATTERN AND SENSING THEREWITH

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch/proximity screens integrated in cellular phones, tablet computers, wearable devices (e.g., watches, fitness trackers, etc.) and other electronic systems). Such touch/proximity screen input devices are often superimposed upon or otherwise collocated with a display of the computing system.

SUMMARY

In some embodiments, a capacitive sensor electrode pattern comprises a plurality of sensor electrodes. The plurality of sensor electrodes are disposed in a common layer with one another and arranged and reshaped to form an ellipse. The ellipse may be a circle. The plurality of sensor electrodes comprises multiple subsets of sensor electrodes. A first subset of the multiple subsets of sensor electrodes has a first shape and a first surface area, wherein centers of mass of the first subset of sensor electrodes are coincident with nodes of a coordinate system. A second subset of the multiple subsets of sensor electrodes has a second subset of sensor electrodes has a second shape and a second surface area. A third subset of the multiple subsets of sensor electrodes has a third shape and a third surface area. The first, second, and third shapes are all different. The first, second, and third surface areas are all different, and the second and third surface areas are less than the first surface area.

In some embodiments, a processing system is configured to acquire capacitive resulting signals from the first subset of sensor electrodes, the second subset of sensor electrodes, and the third subset of sensor electrodes of the above described plurality of sensor electrodes. The processing system is configured to scale, using a multiplicative factor, the capacitive resulting signals received from the second and third subsets of sensor electrodes to achieve scaled resulting signals. The processing system is configured to interpolate position estimates calculated from the resulting signals of the first subset of sensor electrodes and the scaled resulting signals of the second and third subsets of sensor electrodes based on respective deviations from the nodes of the coordinate system to achieve interpolated position estimates. The processing system is further configured to determine a location of an input object with respect to the capacitive sensor electrode pattern based on the interpolated position estimates.

In some embodiments, the above described sensor electrodes and processing system are communicatively coupled and disposed as portions of a capacitive sensing input device.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIGS. 6A and 6B illustrate a flow diagram of an example method of capacitive sensing, in accordance with various embodiments.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. Utilizing techniques described herein, efficiencies may be achieved by manufacturing sensor electrode patterns with elliptical shapes and/or by transforming resulting signals received from such elliptical sensor electrode patterns in a manner that facilitates the use of processing systems, hardware, software, and/or firmware that are configured to sense and/or process inputs from conventional rectangular sensor electrode patterns. This allows for substantial reuse of existing processing systems, hardware, firmware, and/or software with new sensor electrode patterns that have curved edges and elliptical shapes.

Discussion begins with a description of an example input device with which or upon which various embodiments described herein may be implemented. An example sensor electrode pattern and several sensor electrode shapes are then described. This is followed by description of an example processing system and some components thereof. The processing system may be utilized with or as a portion of an input device, such as a capacitive sensing input device. Several example configurations for elliptical sensor electrode patterns are described. Finally, operation of the input devices, processing systems, and components thereof are then further described in conjunction with description of an example method of capacitive sensing that utilizes resulting signals from an elliptical sensor electrode pattern.

Example Input Device

Figure 1A:
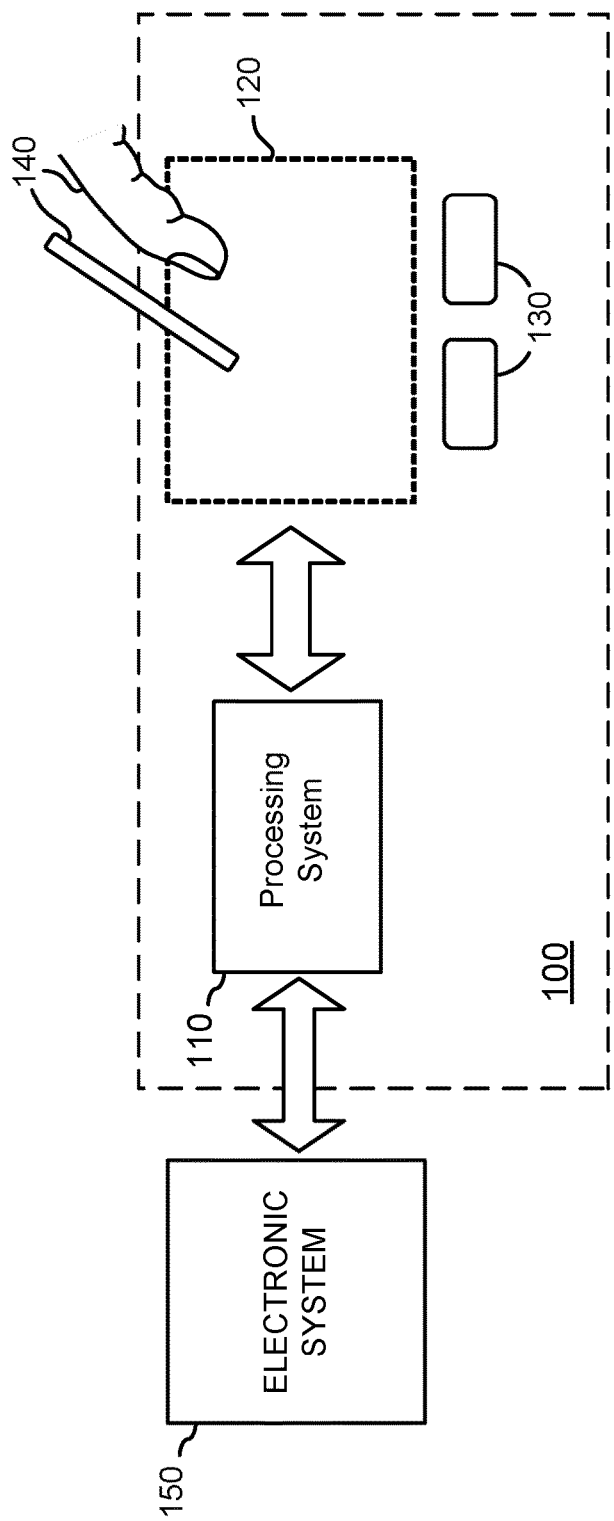
FIGS. 1A and 1B are a block diagrams of an example input device, in accordance with various embodiments.
Figure 1B:
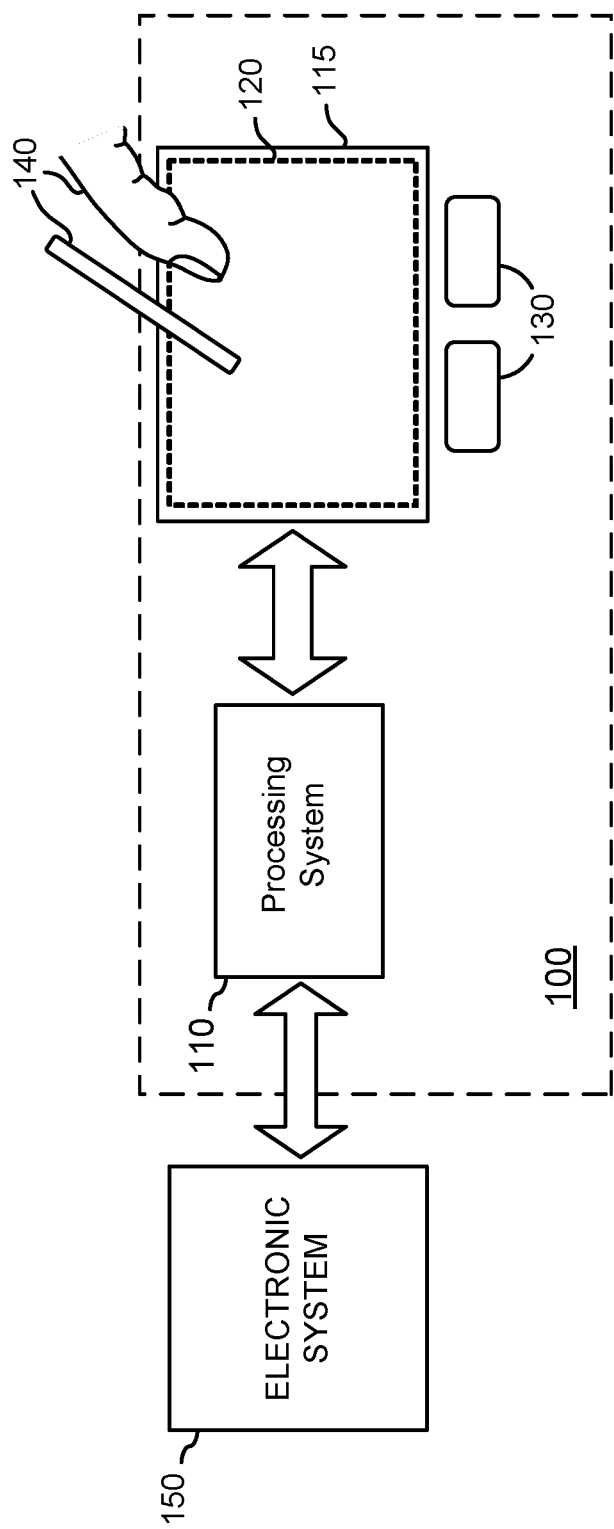

Turning now to the figures, FIG. 1A is a block diagram of an example input device 100, in accordance with various embodiments. FIG. 1B illustrates the same example input device 100 with the addition of a display screen 115, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1A, input device 100 is shown as a proximity sensor device (also often referred to as a "touchpad" or a "touch sensor device") configured to sense input provided by one or more input objects 140 in a sensing region 120. Example input objects include fingers and styli, as shown in FIGS. 1A and 1B.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling.

In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In some embodiments, one or more receiver electrodes may be operated to receive a resulting signal when no transmitter electrodes are transmitting (e.g., the transmitters are disabled or else are not transmitting for purposes of capacitive sensing). In this manner, the resulting signal represents noise detected in the operating environment of sensing region 120. This noise may include display coupled noise. In this manner, in some embodiments, the resulting signal represents noise detected in the operating environment of sensing region 120. For example, display noise of a nearby or co-located (e.g., overlapping) display may be represented in the resulting signal that is received during absolute or transcapacitive sensing. Noise may be similarly detected at other times when transmitters are transmitting.

In FIG. 1A, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance (i.e., transcapacitive) sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor modules configured to operate sensing element(s) or other structures to detect input and determination modules configured to determine positions of any inputs objects detected. For example, a sensor module may perform one or more of absolute capacitive sensing and transcapacitive sensing to detect inputs, and a determination module may determine positions of inputs based on the detected capacitances or changes thereto. In some embodiments, other modules or functionality may be included in processing system 110; for example, an identification module may be included and configured to identify gestures from detected inputs.

In some embodiments, processing system 110 responds to user input (or lack of user input) in sensing region 120 directly by causing one or more actions. Example actions include changing operation modes, as well as Graphic User Interface (GUI) actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. As one example, "zero-dimensional" positional information includes near/far or contact/no contact information. As another example, "one-dimensional" positional information includes positions along an axis. As yet another example, "two-dimensional" positional information includes motions in a plane. As still another example, "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1A shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, as illustrated in FIG. 1B, input device 100 may be a touch/proximity screen, and sensing region 120 overlaps at least part of an active area of a display screen 115. For example, input device 100 may comprise substantially transparent sensor electrodes overlaying the display screen 115 and provide a touch/proximity screen interface for the associated electronic system 150. The display screen 115 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen 115 may share physical elements. For example, some embodiments may utilize some of the same electrical components for displaying and sensing (e.g., sensor electrodes may also be used as common voltage electrodes for the display screen). As another example, the display screen 115 may be operated in part or in total by processing system 110. As another example, sensor electrodes of the touch/proximity sensor may be disposed on a layer of the stack up of an LCD display screen.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

Example Sensor Electrode Pattern

Figure 2A:
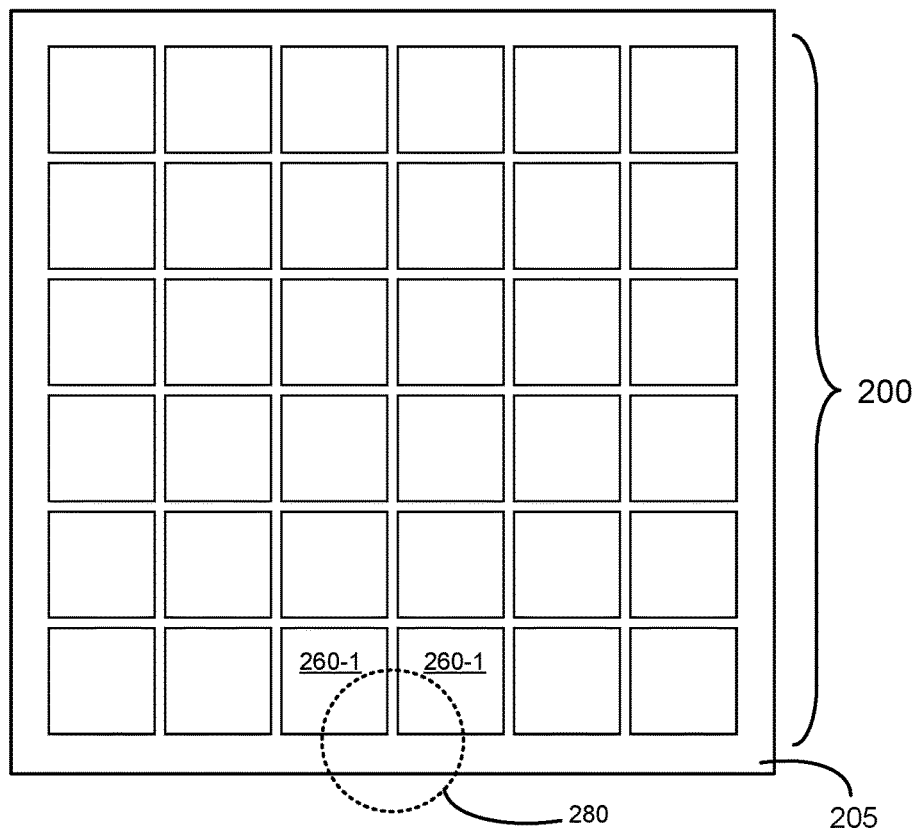
FIG. 2A shows a plan view of an example sensor electrode pattern which may be utilized in a sensor to generate all or part of the sensing region of an input device, such as a touch/proximity screen, in accordance with various embodiments.

FIG. 2A shows a portion of an example sensor electrode pattern 200 which may be utilized in a sensor to generate all or part of the sensing region of input device 100, according to various embodiments. Sensor electrode pattern 200 is disposed upon a substrate 205, which may be glass, silicon, ceramic, crystal, or other material. The dashed circle 280 represents an area which is enlarged and shown in greater detail in FIG. 2B.

Input device 100 is configured as a capacitive sensing input device when utilized with a capacitive sensor electrode pattern. For purposes of clarity of illustration and description, a non-limiting simple single-layer sensor electrode pattern 200 is shown and described. By single layer, what is meant is that all of the sensor electrodes and their routing traces are all disposed in a single common layer with one another. It is appreciated that numerous other sensor electrode patterns may be employed with the techniques described herein, including but not limited to: one single layer pattern with a single set of sensor electrodes disposed on a single side of a substrate 205; two single layer patterns with a single set of sensor electrodes disposed on opposing sides of a substrate 205; patterns with two sets of sensor electrodes disposed in a single layer employing jumpers at crossover regions between sensor electrodes; patterns that utilize one or more sensor electrodes as display electrodes of a display screen (such as one or more segments of a common voltage ($V_{COM}$) electrode, source electrode, gate electrodes, anode electrode or a cathode electrode).

The illustrated sensor electrode pattern is made up of a plurality of sensor electrodes 260 that are identical in square shape and identical in surface area. The individual sensor electrodes 260-1 are arranged such that their centers of mass are on, or nearly on, regularly spaced nodes of a coordinate system, such as a Cartesian coordinate system. The sensor electrodes 260 may be addressed individually, which means each sensor electrode 260-1 may be driven with a transmitter signal and/or used to receive a resulting signal. Thus, sensor electrodes 260 may be utilized as transmitter electrodes, receiver electrodes, or both. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, are areas of localized capacitive coupling between separate transmitter electrodes and receiver electrodes. The capacitive coupling between separate transmitter electrodes and receiver electrodes changes with the proximity and motion of input objects in the sensing region associated with transmitter electrodes and receiver electrodes.

In some embodiments, a sensor electrode pattern 200 is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined.

Receiver electrodes may be operated singly or multiply to acquire resulting signals. The resulting signals may be used to determine measurements of the capacitive couplings at the capacitive pixels where transmitter electrodes and receiver electrodes interact to measure a trans capacitance.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 may be operated to perform absolute capacitive sensing at a particular instance of time. For example, a sensor electrode 260-1 may be charged and then the capacitance of sensor that electrode may be measured. In such an embodiment, an input object 140 interacting with the sensor electrode 260-1 alters the electric field near the sensor electrode, thus changing the measured capacitive coupling. In this same manner, a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260-1 may simply be referred to as a "sensor electrode" or may continue to use its designation as a transmitter electrode or a receiver electrode even though they are used in the same manner during absolute capacitive sensing.

Background capacitance, $C_B$, is the capacitance measured on a sensor electrode with no input object in the sensing region of a sensor electrode pattern. The background capacitance changes with the environment and operating conditions. The background capacitance will often include noise, such as display coupled noise. Thus, the background capacitance can be measured to obtain a noise baseline for the operating environment of a sensor electrode pattern.

Capacitive images and absolute capacitance measurements can be adjusted for the background capacitance of the sensor device for more efficient processing. For example, various techniques may be employed internal and/or external to an ASIC/processing system to subtract/offset some amount of the baseline capacitance that is known to be present in an absolute capacitive measurement. In absolute capacitive sensing, such charge offsetting improves the dynamic range of an amplifier of the ASIC/processing system that is used to amplify a signal which includes an input object related component on top of the baseline absolute capacitance signal measurement. This is because the component of the signal attributed to presence of an input object can be more greatly amplified (without amplifier saturation) if some of the baseline portion is removed by internal offsetting.

Many techniques for internal offset (internal to the ASIC/processing system) of a baseline charge are known in the art and include utilizing an offsetting capacitance in parallel with a feedback capacitor of the amplifier and/or injecting charge to an input of the amplifier that is also coupled with the sensor from which an absolute capacitance is being measured.

Figure 2B:
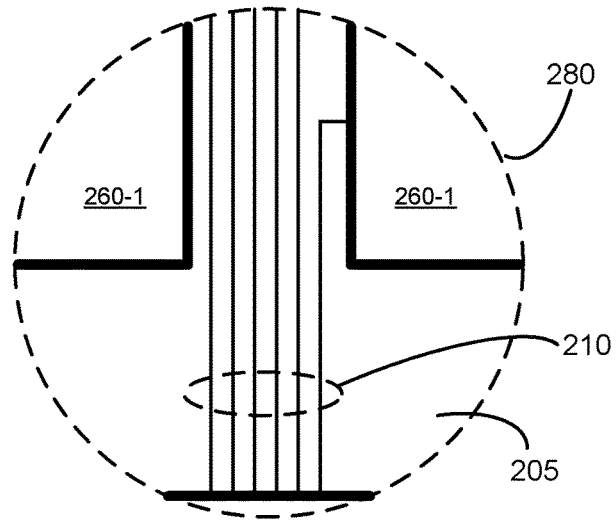
FIG. 2B shows a detail view of a portion of FIG. 2A, in accordance with various embodiments.

FIG. 2B shows a detail view 280 of a portion of FIG. 2A, in accordance with various embodiments. In detail 280, routing traces 210 are illustrated. Routing traces 210 for sensor electrodes 260 are disposed in the gaps between the sensor electrodes 260 in sensor electrode pattern 200. Routing traces 210 are used to communicatively couple sensor electrodes 260 with processing system 110. In some embodiments, the regular arrangement of sensor electrodes 260 allows for routing traces 210 to all enter from a single edge of sensor electrode pattern 200. When this is accomplished, it assists in reducing the effects of ghost inputs that can be picked up by the routing traces. With the regular grid of the sensor electrode pattern and single edge of entry of routing traces, it is easier to discern where the ghosting originates and thus where to compensate. Further, ghosting with straight routing traces which do not zigzag throughout a sensor electrode pattern can be dealt with rather simply because such ghosting is spatially localized. With more complex sensor electrode tiling, ghosting is less likely to be spatially localized.

In some embodiments, one or more of the routing traces 210 can be located in a layer beneath the sensor electrodes 260. In such an embodiment, a routing trace located below in a layer below the sensor electrodes 260 may be coupled to a particular sensor electrode through a via. For example, when the sensor electrodes 260 are part of a display, the one or more of the routing traces 260 can be disposed within a metal layer of the display stackup, and then coupled as required to sensor electrodes 260 through one or more vias. The stackup layer of the display in which one or more routing traces 260 are disposed may be, without limitation: the source electrode layer, the black mask layer, or even an otherwise unused layer.

Figure 2C:
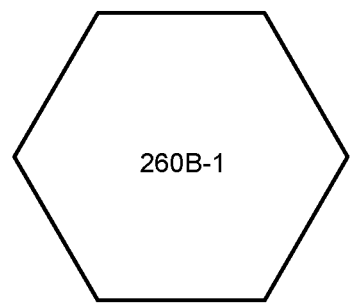
FIGS. 2C and 2D illustrate plan views of some alternative sensor electrode shapes that may be tiled into a sensor electrode pattern such as the one shown in FIG. 2A, in accordance with various embodiments.
Figure 2D:
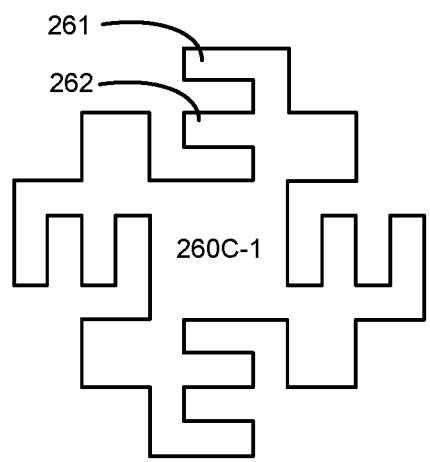

FIGS. 2C and 2D illustrate plan views of some alternative sensor electrode shapes that may be tiled and truncated on the edges of the sensor into a sensor electrode pattern such as the one shown in FIG. 2A, in accordance with various embodiments. As illustrated in FIG. 2C, in some embodiments, a sensor electrode pattern can be composed of tiled hexagon shaped sensor electrodes, such as sensor electrode 260B-1, with some linear edge truncation. As illustrated in FIG. 2D, in some embodiments, a sensor electrode pattern can be composed of tiled shaped sensor electrodes which will interdigitate, such as sensor electrode 260C-1 which has numerous fingers (e.g., 261, 262) which would interdigitate with similar fingers of other sensor electrodes 260-C in a tiled arrangement. Each of sensor electrodes 260-1 and 260B-1 has reflective symmetry on two orthogonal axes. Each of sensor electrodes 260-1, 260B-1, and 260C-1 has rotational symmetry and central symmetry.

Example Elliptical Sensor Electrode Patterns

Figure 3A:
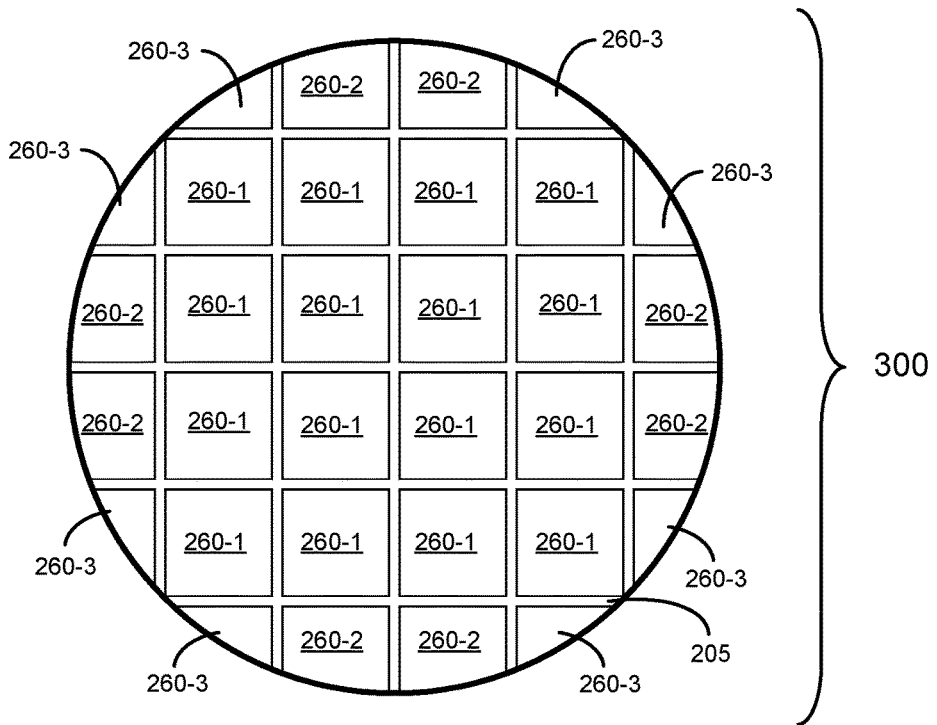
FIG. 3A shows a plan view of an example elliptical sensor electrode pattern, in accordance with various embodiments.

FIG. 3A shows a plan view of an example elliptical sensor electrode pattern 300, in accordance with various embodiments. As with sensor electrode pattern 200, sensor electrode pattern 300 is disposed on a substrate 205. In some embodiments, sensor electrode pattern 200 can be cut or scribed to form elliptical sensor electrode pattern 300. In some embodiments, sensor electrode pattern 300 is part of a capacitive sensing input device used in a wearable electronic device, such as, for example a watch or other electronic device configured to be worn on the wrist of a human. In an embodiment such as a watch, sensor electrode pattern 300 may be configured to receive user touch input when a user touches the face of the watch.

Figure 3B:
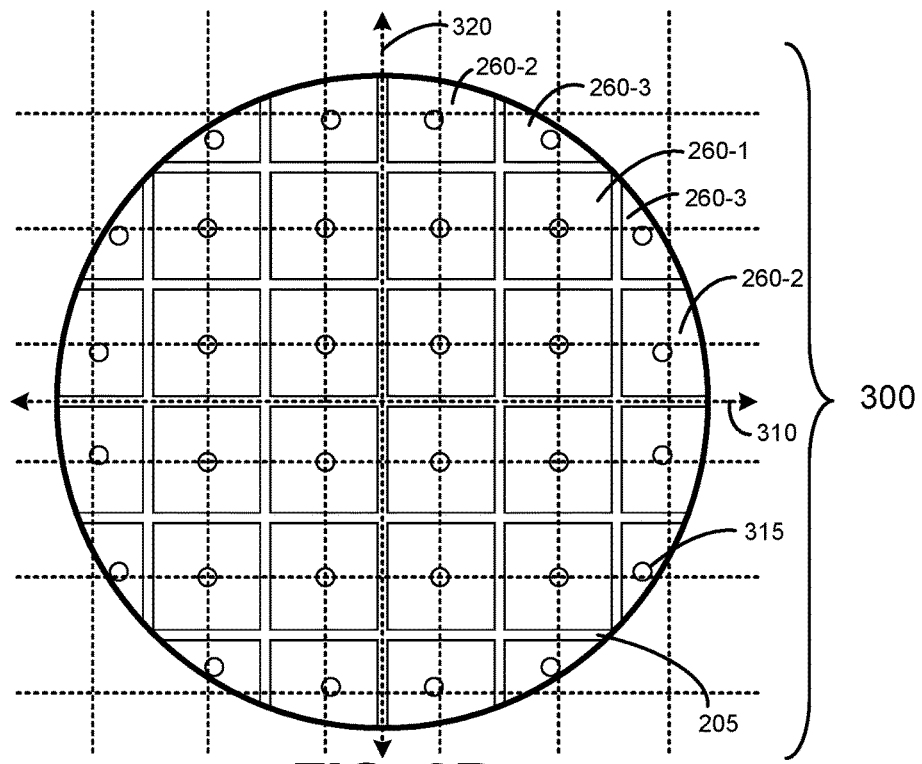
FIG. 3B shows a plan view of the example elliptical sensor electrode pattern of FIG. 3A with centers of mass for each sensor electrode illustrated, in accordance with various embodiments.

FIG. 3B shows a plan view of the example elliptical sensor electrode pattern 300 of FIG. 3A with centers of mass (represented by circles 315) for each sensor electrode 260 illustrated, in accordance with various embodiments.

Sensor electrode pattern 300 comprises a plurality of sensor electrodes 260 disposed in a common layer with one another and arranged to form an ellipse. The elliptical shape of the entire sensor electrode pattern 300 is circular, but in other embodiments may be an elongated ellipse which has an oval shape. By common layer, what is meant is that the sensor electrodes 260 are deposited or otherwise formed in the same layer and are not in separate layers that separated by insulating material or substrate material. The common layer may be a layer of a display, such as a layer in the stack up of a display device. For example, at least one sensor electrode of the plurality of sensor electrodes 260 may comprise one or more display electrodes of the display device that are used in updating the display. Further, the display electrodes may comprise one or more of segments of a Vcom electrode (common electrodes), source drive lines (electrodes), gate line (electrodes), an anode sub-pixel electrode or cathode pixel electrode, or any other display element. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the display electrode can also be referred to as a "combination electrode", since it performs multiple functions. In various embodiments, each of the sensor electrodes comprises one or more display electrodes associated with a pixel or sub pixel. In other embodiments, at least two sensor electrodes may share at least one display electrode associated with a pixel or sub-pixel. The plurality of sensor electrodes 260 comprise at least three subsets of sensor electrodes. The first subset is made up of sensor electrodes 260-1, the second subset is made up of sensor electrodes 260-2, and the third subset is made up of sensor electrodes 260-3.

Sensor electrodes 260-1 of the first subset of sensor electrodes all have a first shape, square in this example, and a first surface area that are common to sensor electrodes of this first subset. As illustrated by FIG. 3B centers of mass (represented by circles 315) of the sensor electrodes 260-1 of the first subset of sensor electrodes are coincident, or very nearly so, with the regularly spaced nodes of a coordinate system represented by x-axis 310 and y-axis 320. In some embodiments, this coordinate system is a Cartesian coordinate system. In some embodiments other coordinate systems are employed. For example, an x/y coordinate system with one or more axes of curvature may be employed and the centers of mass of sensor electrodes 260-1 would be located at regularly spaced nodes of the employed coordinate system. Although sensor electrodes 260-1 are illustrated as a four-by-four pattern, other sizes of patterns that are smaller (e.g., three-by-three) or larger (e.g., five-by-five, six-by-six, seven-by-seven, etc.) are possible and anticipated. The four corners of the hull of such a central grid of whole sensor electrode has corners which are designed to intersect, or very nearly intersect, the edge of the ellipse.

Sensor electrodes 260-2 of the second subset of sensor electrodes have a second shape and a second surface area that are common to the sensor electrodes of this second subset. The second shape is different than the first shape and has one curved exterior edge. The second surface area is different (smaller) than the first surface area.

Sensor electrodes 260-3 of the third subset of sensor electrodes have a third shape and a third surface area that are common to the sensor electrodes of this third subset. The third shape is different than the first shape and the second shape and has one curved exterior edge. The third surface area is different (smaller) than the first surface area. It is also different (smaller) than the second surface area.

It should be noted that sensor electrodes 260-1 of the first subset of sensor electrodes are located in a central region of sensor electrode pattern 300 and may at most have a corner that is on or near the circumferential edge of sensor electrode pattern 300. As will be discussed further below, this is by design. It should also be noted that sensor electrodes 260-2 of the second subset of sensor electrodes and sensor electrodes 260-3 of the third subset of sensor electrodes are located on edge regions of the sensor electrode pattern.

In FIG. 3A, sensor electrodes 260-1 have a base shape of a rectangle (in this case a square), and sensor electrodes 260-2 and 260-3 are truncated versions of these rectangles. The truncation occurs where a regularly tiled pattern of these rectangles ends at the circumferential edge of the elliptical shape of sensor electrode pattern 300. With reference to FIG. 3B, sensor electrode pattern 300 has reflective symmetry along over a first axis (e.g., axis 310) and also has reflective symmetry over a second axis (e.g., axis 320) that is orthogonal to the first axis.

Although the illustrated example in FIG. 3A shows whole electrodes with a base shape that is rectangular, other shapes of sensor electrodes may be used as the base shape that is tiled and then truncated into an ellipse. With reference to FIG. 2C, in some embodiments, the whole sensor electrodes may have a base shape that is hexagonal (e.g., sensor electrode 260B-1), and which can be tiled with like shaped sensor electrodes. With reference to FIG. 2D, in some embodiments, the whole sensor electrodes may have a base shape that is configured with portions which interdigitate with one or more other sensor electrodes when tiled with like shaped sensor electrodes (e.g., sensor electrode 260C-1, as but one example), when tiled or placed in a regular grid depending upon their shape. It should be noted that if a sensor electrode such as sensor electrode 260C-1 were tiled and then truncated in the manner of sensor electrodes 260-2 or 260-3 to form the edge of an ellipse it could have more than one curved exterior edge.

Because of their smaller surface area, resulting signal responses for an equivalent input object interaction from sensor electrodes 260-2 and 260-3 will be proportionally smaller than resulting signals from sensor electrodes 260-1. The decrease in resulting signal response in a sensor electrode 260-2 or 260-3 is proportional to the decrease in surface area as compared to the surface area of a sensor electrode 260-1. In other words, if a sensor electrode 260-2 was ¾ of the surface area of sensor electrode 260-1, then it would be capable of ¾ of the response. For processing system 110A to process the resulting signals of sensor electrodes 260-2 and 260-3 as if they are full sensor electrodes (with the same surface area of a sensor electrode 260-1) their resulting signals are scaled up. In some embodiments, the resulting signal from a sensor electrode 260-2 or 260-3 is scaled up by an inverse of the ratio of its surface area to the surface area of a whole sensor electrode 260-1. For instance, following the example where a sensor electrode 260-2 is presumed to have ¾ of the surface area of a sensor electrode 260-1, the resulting signal from a sensor electrode 260-2 would be scaled up by a scale factor of 4/3. Other methods of scaling are possible in other embodiments.

Although not depicted one or more additional electrodes can be disposed around the perimeter of the sensing region to allow for: sensing just around the outside of the sensing region of the sensor electrode pattern, proximity detection, guarding, and/or expansion of the sensing region beyond the edge of the sensor electrode pattern.

Referring now to FIG. 3B, it can be seen that sensor electrodes 260-1 all have a center of mass (represented by circles such as circle 315) located on or very close to a regularly spaced node of the coordinate system formed by axes 310 and 320. However, due to their truncation the centers of mass of sensor electrodes 260-2 and 260-3 deviate slightly from the regularly spaced nodes of this same coordinate system. In order for processing system 100A to process the resulting signals of sensor electrodes 260-2 and 260-3 as if they are full sensor electrodes with centers of mass that are located on, or substantially on, regularly spaced nodes (as with the centers of mass of sensor electrodes 260-1), their position estimates must be spatially interpolated. In one embodiment a two-dimension interpolation is performed by processing system 110A. In various embodiments, processing system 110A scales the resulting signals of sensor electrodes 260-2 and 260-3, by multiplying by respective scaling factors, before calculating position estimates and performing the interpolation.

A location of an input object with respect to the sensing region of sensor electrode pattern 300 can then be determined. One example of this location determining is processing system 110A utilizing a Gaussian function fitted to the maximum sensor response of a sensor electrode and its two nearest neighbors. When the maximum response is on the border of the sensor electrode pattern 300, the maximum response and its nearest neighboring sensor electrode 260-2 fully inside of the circumference are considered together with a default width of the Gaussian. In some embodiments, when processing system 110A processes resulting signals from a sensor electrode pattern 300 as if it is fully rectangular, any wholly missing sensor electrode locations (e.g., corner electrodes from sensor electrode pattern 200) are padded with a value of zero.

Figure 3C:
FIG. 3C shows a front elevational view (e.g., an edge view) of the sensor electrode pattern of FIG. 3A disposed on a flat substrate, in accordance with various embodiments.

FIG. 3C shows a front elevational view (e.g., an edge view) of the sensor electrode pattern of FIG. 3A disposed on a flat substrate 205-1, in accordance with various embodiments. In such an embodiment sensor electrodes 260-1, 260-2, and 260-3 and any routing traces are not only disposed in the same layer, but they are also co-planar with one another.

Figure 3D:
FIG. 3D shows a front elevational view (e.g., an edge view) of the sensor electrode pattern of FIG. 3A disposed on a curved substrate that has a single radius of curvature, in accordance with various embodiments.

FIG. 3D shows a front elevational view (e.g., an edge view) of the sensor electrode pattern of FIG. 3A disposed on a curved substrate 205-2 that has a single radius of curvature, in accordance with various embodiments. Viewed in three dimensions, in some embodiments, curved substrate 205-2 could have a hemi-cylindrical surface on which a sensor electrode pattern is disposed. The coordinate system used to regularly space whole sensor electrodes 260-1, in one such embodiment, can be an x-y coordinate system with a radius of curvature along one of the x-axis and the y-axis.

Figure 3E:
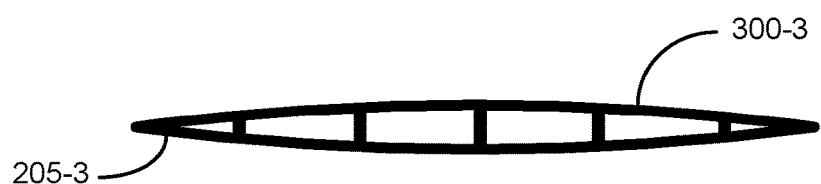
FIG. 3E, shows a front elevational view (e.g., an edge view) of the sensor electrode pattern of FIG. 3A disposed on a curved substrate that has two radiuses of curvature, in accordance with various embodiments.

FIG. 3E, shows a front elevational view (e.g., an edge view) of the sensor electrode pattern of FIG. 3A disposed on a curved substrate that has two radiuses of curvature, in accordance with various embodiments. Viewed in three dimensions, in some embodiments, curved substrate 205-3 could have a hemispherical surface on which a sensor electrode pattern is disposed. The coordinate system used to regularly space whole sensor electrodes 260-1, in one embodiment, can be an x-y coordinate system with a radius of curvature along the x-axis and another (same or different) radius of curvature along the y-axis.

Figure 4:
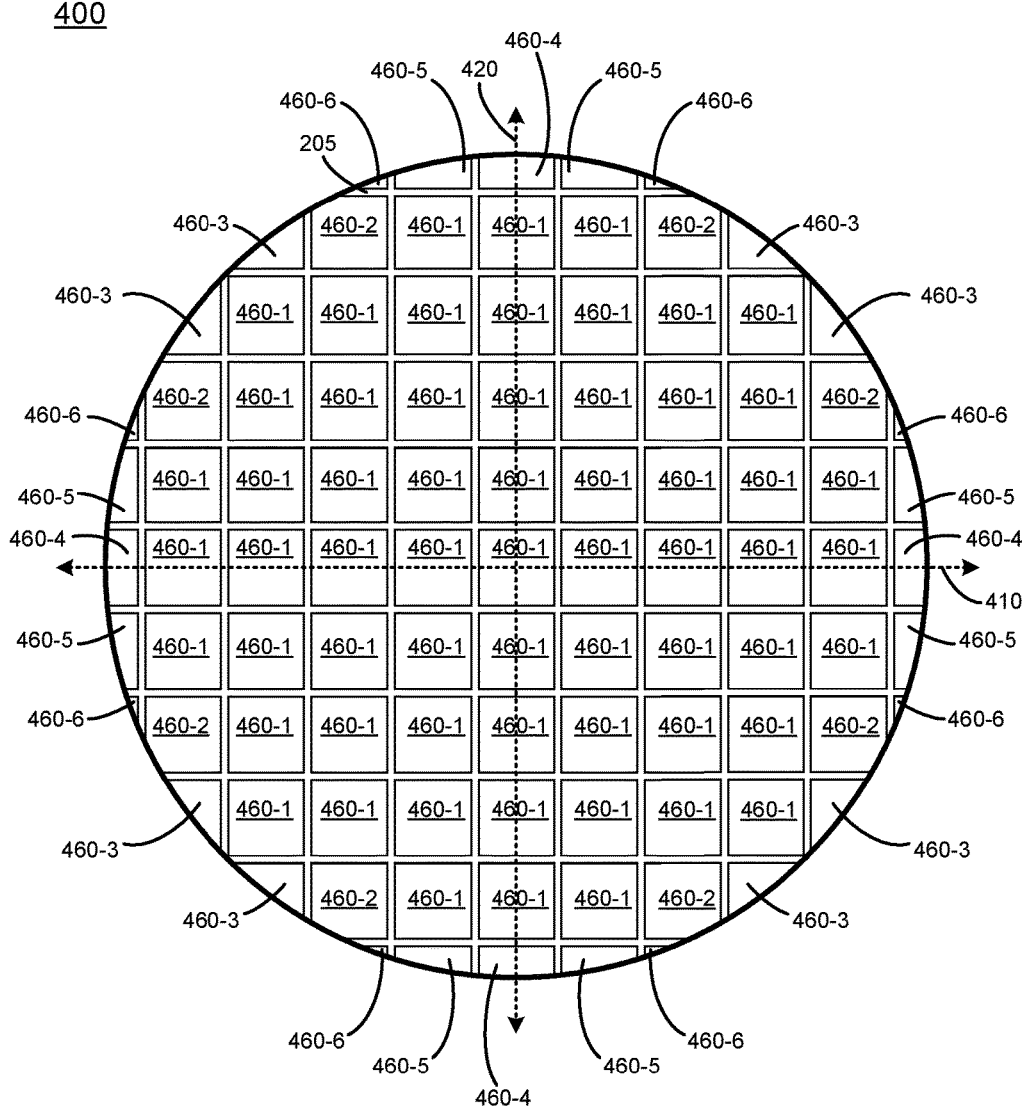
FIG. 4 shows a plan view of an example elliptical sensor electrode pattern, in accordance with various embodiments.

Turning now to FIG. 4. FIG. 4 shows a plan view of an example elliptical sensor electrode pattern 400, in accordance with various embodiments. Sensor electrode pattern 400 is another example of a capacitive sensor electrode pattern and is similar to but includes more sensor electrodes than sensor electrode pattern 300. As with sensor electrode patterns 200 and 300, sensor electrode pattern 400 is disposed on a substrate 205. In some embodiments, sensor electrode pattern 400 can be cut or scribed from a rectangular sensor electrode pattern to form elliptical sensor electrode pattern 400. In some embodiments, sensor electrode pattern 400 is part of a capacitive sensing input device used in a wearable electronic device, such as, for example a watch or other electronic device configured to be worn on the wrist of a human. In an embodiment such as a watch, sensor electrode pattern 400 may be configured to receive user touch input when a user touches the face of the watch.

Sensor electrode pattern 400 comprises a plurality of sensor electrodes 460 disposed in a common layer with one another and arranged to form an ellipse. The elliptical shape of the entire sensor electrode pattern 400 is circular, but in other embodiments may be an elongated ellipse which has an oval shape. By common layer, what is meant is that the sensor electrodes 460 are deposited or otherwise formed in the same layer and are not in separate layers that separated by insulating material or substrate material. As previously discussed with sensor electrode pattern 300, the common layer may be a layer of a display, such as a layer in the stack up of an LCD. The plurality of sensor electrodes 460 comprise at least six subsets of sensor electrodes. The first subset is made up of sensor electrodes 460-1 (whole sensor electrodes), the second subset is made up of sensor electrodes 460-2, the third subset is made up of sensor electrodes 460-3, the fourth subset is made up of sensor electrodes 460-4, the fifth subset is made up of sensor electrodes 460-5, the sixth subset is made up of sensor electrodes 460-6.

Sensor electrodes 460-1 of the first subset of sensor electrodes all have a first shape, square in this example, and a first surface area that are common to sensor electrodes of this first subset. The centers of mass of the sensor electrodes 460-1 of the first subset of sensor electrodes are coincident, or very nearly so, with the regularly spaced nodes of a coordinate system represented by x-axis 410 and y-axis 420. In some embodiments, this coordinate system is a Cartesian coordinate system. Sensor electrodes 460-1 are illustrated as a seven-by-seven pattern. The four corners of the hull of this seven-by-seven grid of whole sensor electrode has corners which are designed to intersect, or very nearly intersect, the edge of the ellipse.

Sensor electrodes 460-2 of the second subset of sensor electrodes have a second shape and a second surface area that are common to the sensor electrodes of this second subset. The second shape is different than the first shape and has one curved exterior edge. The second surface area is different (smaller) than the first surface area.

Sensor electrodes 460-3 of the third subset of sensor electrodes have a third shape and a third surface area that are common to the sensor electrodes of this third subset. The third shape is different than the first shape and the second shape and has one curved exterior edge. The third surface area is different (smaller) than the first surface area. It is also different (smaller) than the second surface area.

Sensor electrodes 460-4 of the fourth subset of sensor electrodes have a fourth shape and a fourth surface area that are common to the sensor electrodes of this fourth subset. The fourth shape is different than the first shape, second shape, and third shape and has one curved exterior edge. The fourth surface area is different (smaller) than the first surface area, the second surface area, and the third surface area.

Sensor electrodes 460-5 of the fifth subset of sensor electrodes have a fifth shape and a fifth surface area that are common to the sensor electrodes of this fifth subset. The fifth shape is different than the first shape, second shape, third shape, and fourth shape and has one curved exterior edge. The fifth surface area is different (smaller) the first surface area, the second surface area, the third surface area, and the fourth surface area.

Sensor electrodes 460-6 of the sixth subset of sensor electrodes have a sixth shape and a sixth surface area that are common to the sensor electrodes of this sixth subset. The sixth shape has one curved exterior edge and is different than the first shape, second shape, third shape, fourth shape, and fifth shape. The sixth surface area is different (smaller) the first surface area, the second surface area, the third surface area, the fourth surface area, and the fifth surface area.

Example Processing System

Figure 5:
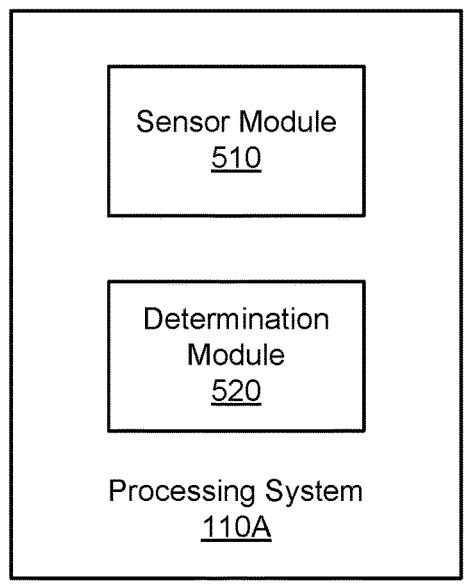
FIG. 5 illustrates a block diagram of some components of an example processing system that may be utilized with an input device, in accordance with various embodiments.

FIG. 5 illustrates a block diagram of some components of an example processing system 110A that may be utilized with an input device (e.g., in place of processing system 110 as part of input device 100), according to various embodiments. As described herein, input device 110 is a capacitive sensing input device, in various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more sensor electrode(s) that implement a sensing region 120 of an input device 100. In some embodiments, processing system 110A and the input device 100 of which it is a part may be disposed in or communicatively coupled with an electronic system 150, such as a display screen, computer, or other electronic system.

In one embodiment, processing system 110A includes, among other components: sensor module 510, and determination module 520. Processing system 110A and/or components thereof may be coupled with sensor electrodes of a sensor electrode pattern, such as sensor electrode pattern 200, among others. For example, sensor module 510 has a plurality of input/output channels coupled with one or more sensor electrodes 260, 460 of a sensor electrode pattern (e.g., sensor electrode pattern 200 of FIG. 2A, 300 of FIG. 3A, or 400 of FIG. 4) of input device 100.

In various embodiments, sensor module 510 comprises sensor circuitry and operates to interact with the sensor electrodes, of a sensor electrode pattern, that are utilized to generate a sensing region 120. This includes operating a first plurality of sensor electrodes to be silent, to be driven with a shield signal, to be used for transcapacitive sensing, and/or to be used for absolute capacitive sensing. This also includes operating a second plurality of sensor electrodes to be silent, to be driven with a shield signal, to be used for transcapacitive sensing, and/or to be used for absolute capacitive sensing. The shield signal may be a substantially constant voltage signal or a varying voltage signal. In one or more embodiments, a shield signal that is a varying voltage signals may also be referred to as a guard signal and has at least one of an amplitude, phase, polarity and waveform in common with the capacitive sensing signal.

Sensor module 510 is a hardware portion of processing system 110A and is configured to acquire transcapacitive resulting signals by transmitting with a first one of a plurality of sensor electrodes of the input device and receiving with a second one of the plurality of sensor electrodes. During transcapacitive sensing, sensor module 510 operates to drive (i.e., transmit) transmitter signals on one or more sensor electrodes of a first plurality of sensor electrodes (e.g., one or more of transmitter electrodes). A transmitter signal may be a square wave, trapezoidal wave, or some other waveform. In a given time interval, sensor module 510 may drive or not drive a transmitter signal (waveform) on one or more of the plurality of sensor electrodes. Sensor module 510 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 510 drives two or more transmitter electrodes of a sensor electrode pattern at one time. When driving two or more sensor electrodes of a sensor electrode pattern at once, the transmitter signals may be coded according to a code. The code may be altered, such as lengthening or shortening the code. Sensor module 510 also operates to receive resulting signals, via a second plurality of sensor electrodes (e.g., one or more of receiver electrodes) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions. It is appreciated that sensor module 510 may, in a similar fashion, transmit transmitter signals on one or more of sensor electrodes and receive corresponding resulting signals on one or more other of sensor electrodes.

In absolute capacitive sensing, a sensor electrode is both driven and used to receive a resulting signal that results from the signal driven on to the sensor electrode. In this manner, during absolute capacitive sensing, sensor module 510 operates to drive a signal on to and receive a signal from one or more of sensor electrodes. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

In various embodiments, sensor module 510 includes one or more amplifiers. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. Sensor module 510 may include other analog components such as capacitors and/or resistors. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. A sensor module 510 may include multiple amplifiers utilized in any of these manners. For example, in some embodiments, a first amplifier may be coupled with a first sensor electrode while a second amplifier is coupled with a second sensor electrode.

Determination module 520 is a portion of processing system 110A and may be implemented as hardware (e.g., hardware logic and/or other circuitry) and/or as a combination of hardware and instructions stored in a non-transitory manner in a computer readable storage medium.

Determination module 520 operates to compute/determine a measurement of a change in a transcapacitive coupling between a first and second sensor electrode during transcapacitive sensing. Determination module 520 then uses such measurements to determine the positional information comprising the position of an input object (if any) with respect to sensing region 120. The positional information can be determined from a transcapacitive image. The transcapacitive image is determined by determination module 520 based upon resulting signals acquired by sensor module 510. The resulting signals are used as or form capacitive pixels representative of input(s) relative to sensing region 120. It is appreciated that determination module 520 operates to decode and reassemble coded resulting signals to construct a transcapacitive image from a transcapacitive scan of a plurality of sensor electrodes.

In embodiments where absolute capacitive sensing is performed with sensor electrodes, determination module 520 also operates to compute/determine a measurement of absolute capacitive coupling to a sensor electrode. For example, determination module 520 operates to determine an absolute capacitance of a sensor electrode after a sensing signal has been driven on the sensor electrode. Determination module 520 then uses such measurements to determine the positional information comprising the position of an input object (if any) with respect to sensing region 120. The positional information can be determined from, for example, an absolute capacitive image or from absolute capacitive profiles.

In some embodiments determination module 520 may utilize measurements (i.e., resulting signals) obtained from both absolute capacitive sensing and transcapacitive sensing (instead of using measurements from just one type of these types capacitive sensing) in determining a position of an input object relative to sensing region 120. This is sometimes referred to as hybrid capacitive sensing. Determination module 520 then uses such measurements to determine the positional information comprising the position of an input object (if any) with respect to sensing region 120. The positional information can be determined from a hybrid capacitive image.

In some embodiments, processing system 110A comprises decision making logic which directs one or more portions of processing system 110A, such as sensor module 510 and/or determination module 520, to operate in a selected one of a plurality of different operating modes based on various inputs.

As will be described herein, processing system 110A may operate, in various embodiments, to perform capacitive sensing using an elliptical capacitive sensor, such as capacitive sensor electrode pattern 300 in any of FIGS. 3A, 3B, 3C, 3D, 3E, or capacitive sensor electrode patter 400 of FIG. 4. For example, with reference to sensor electrode pattern 300 this may comprise processing system 110A operating to: 1) acquire capacitive resulting signals from: sensor electrodes 260-1 of a first subset of sensor electrodes, sensor electrodes 260-2 of a second subset of sensor electrodes, and sensor electrodes 260-3 of a third subset of sensor electrodes; 2) scale up the capacitive resulting signals received from the second and third subsets of sensor electrodes to achieve scaled resulting signals; 3) calculate position estimates from the scaled resulting signals; and 4) interpolate the position estimates based on respective deviations from of their centers of mass from nodes of a coordinate system to achieve interpolated position estimates (wherein sensor electrodes of the first subset of sensor electrodes have their respective centers of mass located at or nearly at regularly spaced nodes of the coordinate system).

In some embodiments, processing system 110A is further configured to determine one or more of the presence and/or a location of an input object with respect to the elliptical capacitive sensor electrode pattern. Such determination is based on the capacitive resulting signals from the first subset of sensor electrodes and the interpolated resulting signals. It should be appreciated that in some embodiment, the determination of the presence and/or location of an input object is performed by hardware, firmware, and/or software of processing system 110A that is/are configured to operate on resulting signals received from a rectangular sensor electrode pattern. This repurposing is made possible by the scaling and interpolating operations that are performed upon resulting signals received from sensor electrodes 260-2 and 260-3 to transform them into signals which mimic signals from a rectangular sensor electrode pattern, such as sensor electrode pattern 200.

Example Method of Capacitive Sensing

FIG. 6A and FIG. 6B illustrate a flow diagram 500 of a method of capacitive sensing, according to various embodiments. Procedures of this method will be described with reference to elements and/or components of one or more of FIGS. 3A-3E, FIG. 4, and FIG. 5. It is appreciated that in some embodiments, the procedures may be performed in a different order than described, that some of the described procedures may not be performed, and/or that one or more additional procedures to those described may be performed. In various embodiments, the method of flow diagram 500 is implemented by a processing system, such as processing system 110A, that is a hardware device. The method of flow diagram 500, in some embodiments, is performed using resulting signals acquired from an elliptical sensor electrode pattern, such as sensor electrode pattern 300 of FIG. 3A. Discussion below focuses describes procedures with reference to sensor electrode pattern 300, however one of skill in the art will realize that similar procedures can be conducted with elliptical sensor electrode patters of different sizes by performing the described procedures with the different subsets of sensor electrodes these other elliptical sensor electrode patterns.

With reference to FIG. 6A, at procedure 610 of flow diagram 500, in one embodiment, capacitive resulting signals are acquired from a first subset of sensor electrodes, a second subset of sensor electrodes, and a third subset of sensor electrodes of an elliptically shaped (from a plan view) sensor electrode pattern. In some embodiments this comprises processing system 110A (e.g., sensor module 510 or some other portion) interacting with a plurality of sensor electrodes (e.g., sensor electrodes 260 of capacitive sensor electrode pattern 300) to receive the plurality of changes in capacitance as a result of capacitive sensing (e.g., absolute capacitive sensing, transcapacitive sensing, hybrid capacitive sensing) from: sensor electrodes 260-1 of a first subset of like to one another surface area sensor electrodes, sensor electrodes 260-2 of a second subset of like to one another surface area sensor electrodes, and/or sensor electrodes 260-3 of a third subset of like to one another surface area sensor electrodes.

With continued reference to FIG. 6A, at procedure 620 of flow diagram 500, in one embodiment, the capacitive resulting signals received from the second subset of sensor electrodes and the third subset of sensor electrodes are scaled up to achieve scaled resulting signals. In various embodiments, this comprises a processing system, such as processing system 110A (e.g., determination module 520 or other portion thereof) performing the scaling. For example, the resulting signal from a sensor electrode 260-2 or 260-3 is scaled up by an inverse of the ratio of its surface area to the surface area of a whole sensor electrode 260-1. For instance, in an example where a sensor electrode 260-3 has 9/16 of the surface area of a sensor electrode 260-1, the resulting signal from a sensor electrode 260-3 would be scaled up by a scale factor of 16/9 to achieve a scaled resulting signal for that sensor electrode. Similarly, in an example where sensor electrode 260-3 has 3/4 of the surface area of a sensor electrode 260-1, the resulting signal from a sensor electrode 260-2 would be scaled up by a scale factor of 4/3 to achieve a scaled resulting signal for that sensor electrode.

With continued reference to FIG. 6A, at procedure 630 of flow diagram 500, in one embodiment, position estimates are calculated from the resulting signals of the first subset of sensor electrodes and from the scaled resulting signals of the second and third subsets of sensor electrodes. These positions estimates are then interpolated based on respective deviations from the nodes of the coordinate system to achieve interpolated position estimates. Where there is little or no deviation, little or no interpolation may be required. In various embodiments, this comprises a processing system, such as processing system 110A (e.g., determination module 520 or other portion thereof) performing the interpolation. This can involve processing system 110A performing a two-dimensional spatial interpolation using position estimates computed from the resulting signals from any sensor electrodes 260-1 and the scaled resulting signals from any sensor electrodes 260-2 and 260-3 which were used in the performance of capacitive sensing.

With reference to FIG. 6B, as illustrated in procedure 640 of flow diagram 500, in some embodiments, the method as described in 610-630 further comprises determining a location of an input object with respect to the elliptical capacitive sensor electrode pattern based on the interpolated position estimates. For example, processing system 110A may use a Gaussian function fitted to the maximum sensor response of a sensor electrode and its two nearest neighbors when determining a location of an input object from the position estimates. When an input object is interacting with the sensing region associated with sensor electrode pattern 300 the presence can be detected and location with respect to sensing region 120 and/or sensor electrode pattern 300 determined by processing the aforementioned signals. In various embodiments, this comprises a processing system, such as processing system 110A (e.g., determination module 520 or other portion thereof) determining whether or not an input object (e.g., 140) is present in the sensing region (e.g., sensing region 120) and/or determining the location of the input object with respect to an elliptical sensor electrode pattern, such as sensor electrodes pattern 300. In some embodiments, processing system 110A performs this determination by using hardware, firmware, and/or software that is configured to operate on resulting signals received from a rectangular and/or regularly spaced sensor electrode pattern composed of sensor electrodes of uniform surface area and shape. This is made possible by scaling resulting signals from sensor electrodes 260-2 and 260-3 such that they appear to from regularly spaced sensor electrodes of a rectangular sensor electrode pattern and then interpolating the position estimates that are calculated from the scaled resulting signals. In some embodiments, if required, zero values may be substituted (and provided to processing system 110A) for resulting signals from any sensor electrodes which are entirely absent from such a hypothetical rectangular sensor electrode pattern. In some embodiments, such zero values can additionally or alternatively be used to pad a capacitive image where there are no sensor electrodes when a complete two-dimensional image is needed to be created for application to firmware that is expecting a rectangular sensing region Conclusion The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

What is claimed is:
1. A capacitive sensor input device comprising:
a sensor electrode pattern formed of a plurality of sensor electrodes disposed in a common layer with one another and arranged to form an ellipse, said plurality of sensor electrodes being arranged in a plurality of columns, said plurality of sensor electrodes comprising:
  a first subset of sensor electrodes having a first shape and a first surface area,
    wherein centers of mass of said first subset of sensor electrodes are coincident with nodes of a coordinate system,
  wherein the first subset includes a first pair of sensor electrodes arranged in a first pair of the columns and a second pair of sensor electrodes arranged in a second pair of the columns,
  wherein the first pair of columns is disposed between the second pair of columns;
  a second subset of sensor electrodes having a second shape and a second surface area, wherein the second subset includes a pair of sensor electrodes arranged in the first pair of columns; and
  a third subset of sensor electrodes having a third shape and a third surface area, wherein the third subset includes a pair of sensor electrodes arranged in the second pair of columns,
  wherein each sensor electrode in the first subset, the second subset, and the third subset is arranged in a respective one of the columns,
  wherein said first, second, and third shapes are all different,
  wherein said first, second, and third surface areas are all different, and
  wherein said second and third surface areas are less than said first surface area; and a processing system configured to:
receive capacitive resulting signals from said plurality of sensor electrodes;
scale up a subset of said capacitive resulting signals received from said second subset of sensor electrodes by multiplication with a ratio of the first surface area to the second surface area to achieve a first set of scaled resulting signals, wherein the ratio of the first surface area to the second surface area exceeds 1;
scale up a subset of said capacitive resulting signals received from said third subset of sensor electrodes by multiplication with a ratio of the first surface area to the third surface area to achieve a second set of scaled resulting signals, wherein the ratio of the first surface area to the third surface area exceeds 1;
interpolate position estimates calculated from said resulting signals of said first subset of sensor electrodes and said first set and second set of scaled resulting signals, wherein said interpolation is based on respective deviations from said nodes of said coordinate system to achieve interpolated position estimates; and determine a location of an input object with respect to said capacitive sensor electrode pattern based on said interpolated position estimates.

2. The sensor electrode pattern of claim 1, wherein said common layer is a layer of a display.

3. The sensor electrode pattern of claim 1, wherein said ellipse is a circle.

4. The sensor electrode pattern of claim 1, wherein said first shape is one of a rectangle and a hexagon or an interdigitated electrode.

5. The sensor electrode pattern of claim 1, wherein said first shape is configured with portions which interdigitate with one or more other sensor electrodes of said first subset of sensor electrodes.

6. The sensor electrode pattern of claim 1, wherein said second and third shapes each have one curved exterior edge.

7. The sensor electrode pattern of claim 1, wherein said plurality of sensor electrodes have reflective symmetry along over a first axis and reflective symmetry over a second axis that is orthogonal to said first axis, wherein said first axis is located between said first pair of columns.

8. The sensor electrode pattern of claim 1, wherein said first subset of sensor electrodes are located in a central region of said sensor electrode pattern and wherein said second and third subsets of sensor electrodes are located on edge regions of said sensor electrode pattern.

9. The sensor electrode pattern of claim 1, wherein said coordinate system comprises a Cartesian coordinate system.

10. The sensor electrode pattern of claim 1, wherein centers of mass of said second and third subsets of sensor electrodes deviate from said nodes of said coordinate system.

11. A capacitive sensing input device comprising:
a capacitive sensor electrode pattern formed of a plurality of sensor electrodes disposed in a common layer with one another and arranged to form an ellipse, said plurality of sensor electrodes comprising:
a first subset of sensor electrodes having a first shape and a first surface area, wherein centers of mass of said first subset of sensor electrodes are coincident with nodes of a coordinate system;
a second subset of sensor electrodes having a second shape and a second surface area;
a third subset of sensor electrodes having a third shape and a third surface area;
wherein said first, second, and third shapes are all different; and
wherein said first, second, and third surface areas are all different and said second and third surface areas are less than said first surface area;
wherein centers of mass of said second and third subsets of sensor electrodes deviate from said nodes of said coordinate system; and
a processing system configured to:
receive capacitive resulting signals from said plurality of sensor electrodes;
scale up a subset of said capacitive resulting signals received from said second subset of sensor electrodes by multiplication with a ratio of the first surface area to the second surface area to achieve a first set of scaled resulting signals, wherein the ratio of the first surface area to the second surface area exceeds 1;
scale up a subset of said capacitive resulting signals received from said third subset of sensor electrodes by multiplication with a ratio of the first surface area to the third surface area to achieve a second set of scaled resulting signals, wherein the ratio of the first surface area to the third surface area exceeds 1;
interpolate position estimates calculated from said resulting signals of said first subset of sensor electrodes and said first set and second set of scaled resulting signals,
wherein said interpolation is based on respective deviations from said nodes of said coordinate system to achieve interpolated position estimates; and
determine a location of an input object with respect to said capacitive sensor electrode pattern based on said interpolated position estimates.

12. The capacitive sensing input device of claim 11, further comprising:
a display, wherein said common layer is layer of said display.

13. The capacitive sensing input device of claim 11, wherein said first shape is one of a rectangle and a hexagon.

14. The capacitive sensing input device of claim 11, wherein said first shape is configured with portions which interdigitate with one or more other sensor electrodes of said first subset of sensor electrodes.

15. The capacitive sensing input device of claim 11, wherein said plurality of sensor electrodes have reflective symmetry along over a first axis and reflective symmetry over a second axis that is orthogonal to said first axis.

16. The capacitive sensing input device of claim 11, wherein said first subset of sensor electrodes are located in a central region of said sensor electrode pattern and wherein said second and third subsets of sensor electrodes are located on edge regions of said sensor electrode pattern, wherein said second shapes each have one curved exterior edge, and wherein said third shapes each have one curved exterior edge.

17. The capacitive sensing input device of claim 11, wherein said coordinate system comprises a Cartesian coordinate system.

18. A processing system for a capacitive sensing input device:
said processing system communicatively configured to couple with an elliptical sensor capacitive electrode pattern comprising a first subset of sensor electrodes, a second subset of sensor electrodes, and a third subset of sensor electrodes, wherein said first subset of sensor electrodes have a first shape and a first surface area and have centers of mass coincident with nodes of a coordinate system, wherein said second subset of sensor electrodes have a second shape and a second surface area, wherein said third subset of sensor electrodes have a third shape and a third surface area, wherein said first, second, and third shapes are all different, wherein said first, second, and third surface areas are all different and said second and third surface areas are less than said first surface area, and wherein centers of mass of said second and third subsets of sensor electrodes deviate from said nodes of said coordinate system; and
said processing system configured to:
acquire capacitive resulting signals from said first subset of sensor electrodes, said second subset of sensor electrodes, and said third subset of sensor electrodes;
scale up a subset of said capacitive resulting signals received from said second subset of sensor electrodes by multiplication with a ratio of the first surface area to the second surface area to achieve a first set of scaled resulting signals, wherein the ratio of the first surface area to the second surface area exceeds 1;

scale up a subset of said capacitive resulting signals received from said third subset of sensor electrodes by multiplication with a ratio of said first surface area to said third surface area to achieve a second set of scaled resulting signals, wherein the ratio of the first surface area to the third surface area exceeds 1; and interpolate position estimates calculated from said resulting signals of said first subset of sensor electrodes and said first set and second set of scaled resulting signals, wherein said interpolation is based on respective deviations from said nodes of said coordinate system to achieve interpolated position estimates.

19. The processing system of claim 18, further configured to:

determine a location of an input object with respect to said elliptical capacitive sensor electrode pattern based on said interpolated position estimates.

20. The processing system of claim 18, wherein said determining a location is performed by firmware configured to operate on resulting signals received from a rectangular sensor electrode pattern.

* * * * *